Figure 1:
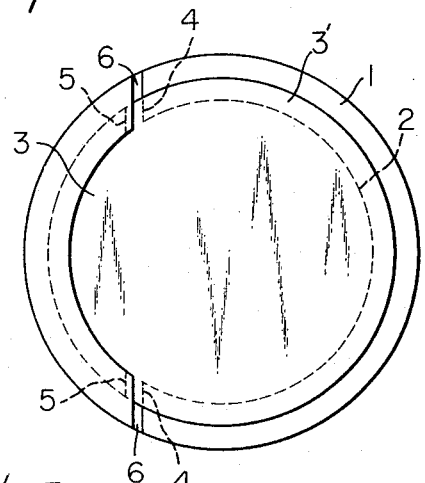

May 27, 1969  JURO WADA  3,445,863
ONE-WAY VALVE DEVICE SUITABLE FOR USE AS A HEART VALVE
Filed Nov. 30, 1966  Sheet 1 of 5

INVENTOR.
JURO WADA
BY
ATTORNEY

May 27, 1969  JURO WADA  3,445,863
ONE-WAY VALVE DEVICE SUITABLE FOR USE AS A HEART VALVE
Filed Nov. 30, 1966  Sheet 2 of 5

INVENTOR.
JURO WADA
BY
ATTORNEY

United States Patent Office 3,445,863
Patented May 27, 1969

3,445,863
ONE-WAY VALVE DEVICE SUITABLE FOR USE AS A HEART VALVE
Juro Wada, 19 Nishi 4-chome, Kita 21-joh, Sapporo-shi, Hokkaido, Japan
Filed Nov. 30, 1966, Ser. No. 598,032
Claims priority, application Japan, Dec. 8, 1965, 40/75,171, 40/99,436
Int. Cl. A61f 1/22; F16h 15/03
U.S. Cl. 3—1                              8 Claims The present invention relates to a valve device and particularly to a hingeless one-way valve device especially useful for artificial valve or heart valve.

The prior art one-way valve device is, for example, provided with a floating valve member such as a ball or two discs, or provided with additional hinge means or complicated mechanism for permitting the flap valve to be swingably opened or closed, thereby resulting in higher cost to manufacture because of its complicated construction or resulting in inaccurate performance of the valve device.

Moreover, such a ball valve, when applied to human heart, for example, takes considerable space within the heart thereby largely decreasing the efficiency of the actuation of the human heart. Disc valve is, too, as well as ball valve, constructed in such fashion that the valve (ball or plate) is encased in a cage, which interferes with heart contraction. On the other hand, the flap valve of prior art, which is provided with additional hinge means for permitting the flap valve to be swung, results in clotting of blood at the position where the additional hinge means is secured, when such a flap valve is attached to the human heart, thereby harming the heart.

Therefore, one object of this invention is to provide a one-way valve device which avoids the aforementioned disadvantages and which is simple in construction, suitable for mass production at lower cost and yet accurate in actuation during a long period.

The other object of this invention is to provide an artificial valve device or heart valve which has the above mentioned character and has a minimal space occupation by the valve ball or lenticulum and is easy to be attached to the human heart and yet capable of being actuated accurately and permanently.

Another object of this invention is to provide a valve device of the above character which has no additional hinge means or valve ball or lenticulum containing cage for opening and closing the flap valve so that the fluid flowing through the valve device is not disturbed by such an additional means attached to the valve device.

A further object of this invention is to provide a hingeless artificial flap valve or heart valve having swingable valve plate of the above mentioned character which has minimal flow resistance and will not cause the blood flowing through the valve to clot due to provision of the hinge means.

This invention is characterized by the construction comprising a base member which has an opening therein, and a swingable valve plate or flap valve having a size slightly larger than the opening of said base member to close said opening when the swingable valve plate is in closed position in contact with said base member in alignment therewith, said base member having a piece cut out of notch cut in each side of the periphery of said opening at positions opposite or symmetrical with respect to a center line of the base member and spaced apart from the line passing the center of area of the opening of the base member at right angle to the aforementioned center line, said valve plate having corresponding cutouts on the periphery thereof which are adapted to be engaged with said cutouts of said base member, respectively so that the valve plate can be swingably mounted on the base member in alignment therewith without using any additional hinge means to permit the opening of said base member to be opened and closed when the valve member is swung, thereby affording one way valve device action.

In accordance with another aspect of this invention, two or more swingable valve plates are provided on a base member for effecting opening and closing the opening of the base member without using any additional hinge means for mounting the valve plates on the base member, each of said valve plates located in neighbouring relationship to each other on the opening of the base member and being swingably mounted on the periphery of the opening of the base member with the notches thereof similar to those of the above mentioned valve device being engaged with the corresponding notches provided on the periphery of the opening. One side of each of the valve plates divided by the axis of swinging of the plates is made larger in area than the area of the other side, so that the fluid flowing through the valve device in one direction effects the opening of the valve device due to the pressure difference exerted on each side of each of the valve plates, while the fluid flowing in the opposite direction effects the closing of the valve device.

Figure 2:
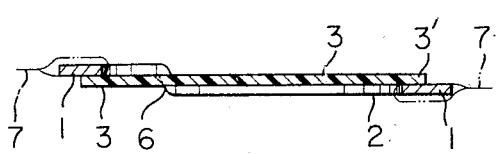
Figure 3:
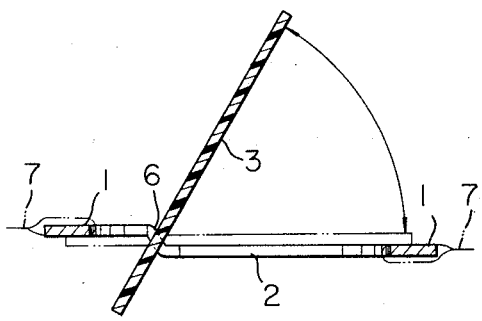
Figure 4:
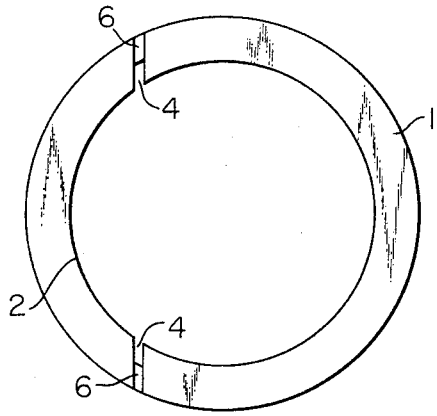
Figure 5:
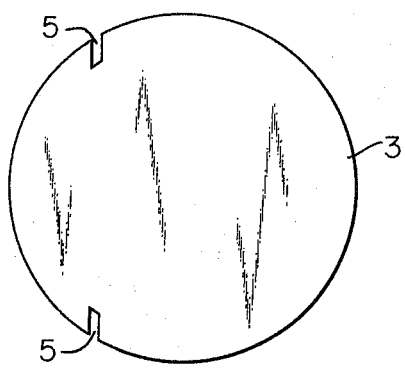
Figure 6:
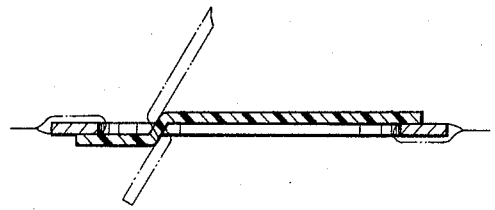
Figure 7:
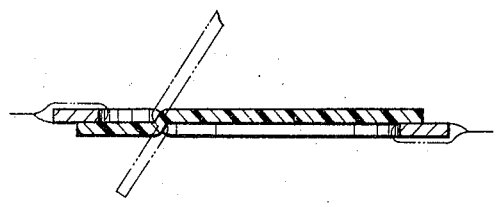
Figure 8:
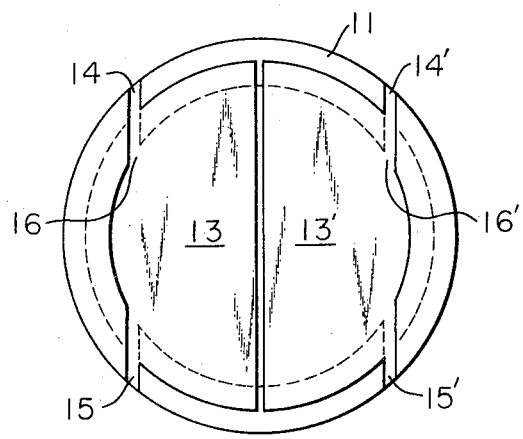
Figure 9:
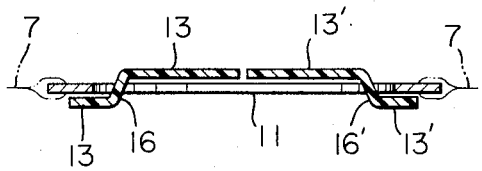
Figure 10:
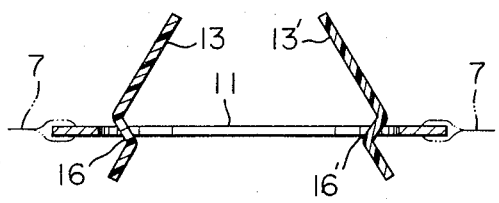
Figure 11:
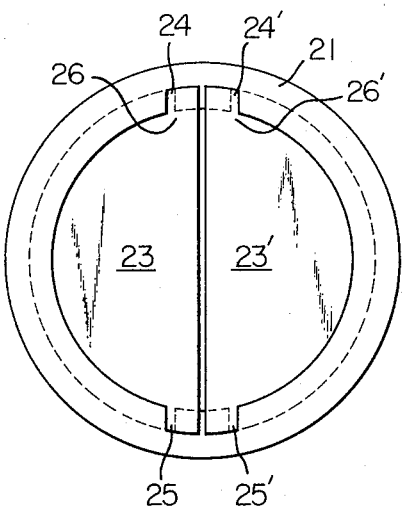
Figure 12:
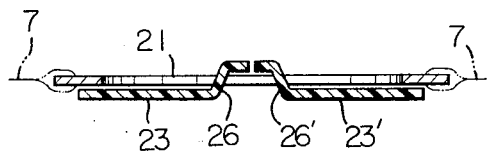
Figure 13:
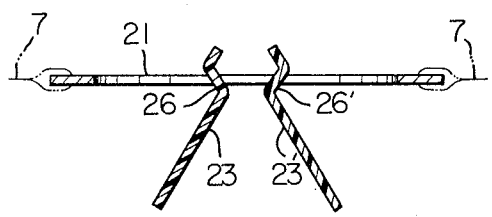
Figure 14:
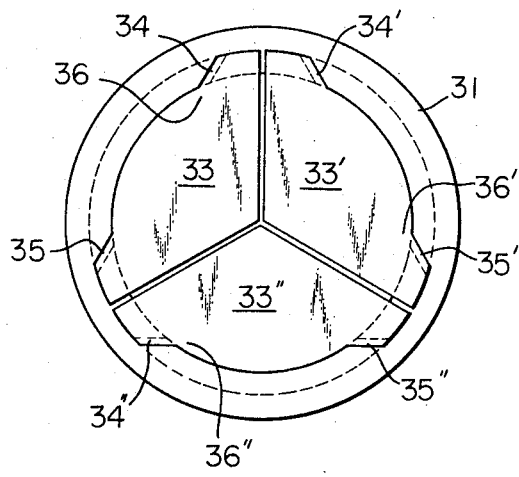
Figure 15:
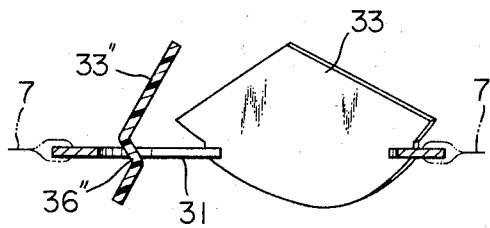

The objects and advantages of this invention will be apparent from the following description when read in connection with the attached drawings which illustrate the embodiments of this invention. It must be understood, however, that this invention is not limited to the illustrated embodiments, but is limited only by the appended claims. In these drawings:

FIG. 1 is a plan view showing one embodiment of this invention which is constructed as an artificial valve or heart valve, FIG. 2 is a sectional view of FIG. 1, FIG. 3 is a sectional view similar to FIG. 2 but showing the swingable valve plate in opened state, FIG. 4 is a plan view showing the base member, FIG. 5 is a plan view showing the valve plate, FIG. 6 is a cross sectional view similar to FIG. 2 but showing modified form of this invention, FIG. 7 is a cross sectional view similar to FIG. 6 but showing further modified form of this invention, FIG. 8 is a plan view of the modified construction of the valve device in accordance with this invention which is provided with two swingable valve plates, FIGS. 9 and 10 are cross sectional views of FIG. 8 showing the valve device in closed and opened state, respectively, FIG. 11 is a plan view of the second modification of this invention having two swingable valve plates but which swing about axes which are positioned in different locations from those of FIG. 8, FIGS. 12 and 13 are cross sectional views of FIG. 11 showing the valve device in closed and opened state, respectively, FIG. 14 is a plan view showing the third modification of this invention which is provided with three swingable valve plates, and FIG. 15 is a cross sectional view showing the valve device of FIG. 14 in opened state.

Now referring to the drawings, particularly to FIGS. 1 and 2, base member 1 is made of synthetic resin or compound in the annular shape with a circular opening 2 being provided at the center thereof. Swingable valve plate 3 with peripheral portion 3' of valve plate 3 being and has a size slightly larger than said opening 2 of base member 1 so that opening 2 is completely closed by valve plate 3 with peripheral portion 3' of valve plate 3 being superposed on the periphery of said opening 2 when valve plate 3 is in contact with and in line with base member 1.

It must be noted, however, that base member 1 and swingable valve plate may be made of any material other than synthetic resin insofar as the material selected has flexibility and, preferably, resiliency, and is of the nature to withstand permanently against substances to which they are exposed without causing any corrosion or the like.

Notches 4, 5 are formed in base member 1 and valve plate 3 at the corresponding positions symmetrical with respect to a diameter of each of base member 1 and valve plate 3 and spaced apart from the diameter which is perpendicular to the aforesaid diameter of each of base member 1 and valve plate 3. The corresponding cutouts of base member 1 and valve plate 3 are engaged with each other by deforming any or both of base member 1 and valve plate 3 and thereafter returned to the initial shape, so that valve plate 3 can be swung with respect to base member 1 about an axis defined by the engagement of said notches 4, 5. Base member 1 shown may be provided with stepped portion 6 so that base member 1 is made in Z-shape thereby providing the clearance between the lower surface of one of the portions of base member 1 divided by said stepped portion 6 and the upper surface of the other of the positions of base member 1 equal to the thickness of said valve plate 3 so as to permit valve plate 3 to completely cover said base member 1 thereby closing said opening 2 when said valve plate 3 is swung to its closed position onto said base member 1. Strong and soft fabric 7 of synthetic resin, for example, is attached around the periphery of said base member 1 so as to serve as mounting means for attaching the valve assembly to the human heart when the operation of the heart is carried out. It is well-known that said fabric 7 is tolerated by the human body after the operation to assure permanent use of the valve assembly within the human body.

In the embodiment shown in FIGS. 1 and 2, stepped portion 6 is provided in base member 1. However, it is possible to provide the stepped portion in valve plate 3 as shown in FIG. 6 instead of providing same in base member 1, or further modification is possible in which stepped portions are provided in both base member 1 and valve plate 3 wherein the combined effect of the stepped portions in both base member 1 and valve plate 3 provides the intimate engagement of base member 1 with valve plate 3 for completely closing the opening in base member 1 when valve plate is swung to its closed position.

It must be noted, however, that the stepped portion 6 is not always necessary to be provided on either or both of the base member and the valve plate, it only suffices to provide such a stepped configuration along the line of each of the cutouts of either one of the base members and the valve plate, the remaining portion of the valve plate being allowed to be flat thereby facilitating the flow of fluid through the valve device by virtue of the flatness of the valve plate. The embodiments shown are constructed in circular form having a circular opening in the base member; however, the valve assembly can be constructed in any form other than the circular form such as ellipse, rectangular form or polygonal form insofar as one of the areas divided by the pivoting axis given by the engagement of the cutouts is made different from the other of the areas. Such modifications are also in the scope of this invention.

The operation of the one way valve device as described above is as follows. When the fluid flows downwardly from the upper side of the valve device, valve plate 3 is swung clockwise to its closed position as shown in FIG. 2, because the total pressure applied to the right side of valve plate 3 divided by stepped portion 6 is apparently greater than the total pressure applied to the left side of valve plate 3 so that valve plate 3 is swung clockwise as viewed in FIG. 2 thereby closing the valve device. When the fluid flows upwardly from the lower side of valve plate 3, valve plate 3 is swung anticlockwise for the same reason as above so that the valve device is opened as shown in FIG. 3. This actuation provides the one way flow of the fluid.

FIG. 8 shows a modification of this invention. The valve device of FIG. 8 is provided with two valve plates 13, 13' symmetrically shaped in half circle form and arranged symmetrically on the base member 11. Cutouts 14, 15, 14' and 15' of base member 11 provide the swinging action of each of valve plates 13, 13', when the corresponding notches in valve plates 13, 13' are interengaged with said notches 14, 15, 14' and 15' of base member 11. The area of one side of each of valve plates 13, 13' at the inside of the opening of base member 11 divided by the axis passing through the engagement of said cutouts is made greater than the remaining area so that the fluid flowing in one direction opens the valve plates (FIG. 10) while the fluid flowing in the opposite direction closes the valve plates (FIG. 9) like the embodiment shown in FIG. 1. It must be noted that valve plates 13, 13' shown are provided with stepped portions 16, 16'. However, stepped portions extending the entire length of valve plates are not necessary. It suffices to provide stepped configuration only at the region of each of the cutouts; the remaining portion of the valve plates can be made flat thereby facilitating the fluid flow through the valve device.

FIGS. 11 to 13 show another modification of this invention. The valve plates 26, 26' are in the shape similar to those of FIG. 8, except that the cutouts 24, 25, 24' and 25' interengaging the base member 21 with valve plates 23, 23' are located adjacent to a line passing a diameter, so that valve plates are opened at their outer sides instead of being opened at the inside as shown in FIG. 8. The stepped portions 26, 26' may be dispensed with if only the region of each of the cutouts in either or both of base member 21 and valve plates 23, 23' is provided with such a stepped configuration for the reason previously described.

FIGS. 12 and 13 show the valve plates 23, 23' in closed state and in opened state, respectively.

Another embodiment of this invention is shown in FIGS. 14 and 15. This embodiment has three neighbouring valve plates 33, 33' and 33" swingably mounted on a base member 31 with their respective cutouts 34, 35, 34', 35' and 34", 35" of the base member and the valve plates interengaging with each other in like manner as stated previously. FIG. 15 shows the valve plates in opened state.

It must be noted that more than three valve plates can be mounted in like manner as shown in FIG. 14.

The actuation of the embodiments shown in FIGS. 8–15 are similar to the actuation of the embodiment shown in FIG. 1.

The fluid flowing in one direction through the valve device closes the valve plates due to the total pressure difference exerted on respective sides of the surface of the valve plates divided by the axes through engagement of th cutouts as stated in connection with the embodiment shown in FIG. 1, while the fluid flowing in the opposite direction opens the valve plates so that one way valve actuation is achieved.

Since the valve device of this invention is constructed as above, it provides a novel one way valve device comprised of only a base member and a valve plate particularly useful for artificial valve or heart valve, which is extremely simple in construction and easy to manufacture at low cost and accurate in operation without requiring any additional complicated mechanism such as hinge means and the like.

When the valve device of this invention is used as a heart valve, the valve device is actuated by the action of the human heart, swingable valve plate 3 serving as human valve thereby stopping completely the return flow of blood.

What I claim is:
1. A one-way valve device comprising a base member provided with an opening therein and a swingable valve plate having a size slightly larger than said opening of said base member so as to permit said valve plate to completely cover said opening in close contact therewith, said base member provided with a cutout on each side of the periphery of said opening at positions opposite with respect to a center line of said opening of said base member and spaced apart from the line passing the center of area of said opening at right angle to said center line, said valve plate also provided with corresponding cutouts on the periphery thereof so that said cutouts of said valve plate are engaged with said cutouts of said base member, respectively, when said valve plate is placed in alignment with said base member thereby permitting said valve plate to be swung with respect to said base member about an axis defined by the engagement of said cutouts so as to open and close said opening, at least one of said base member and swingable valve plate provided with stepped portions at least in the regions of said cutouts to provide stepped location of the edges of said cutouts so that said valve plate can completely cover the opposing peripheral surface of the opening of said base member when said valve plate is in its closed position.

2. An artificial valve device of the type defined in claim 1, a strong soft fabric mounted around the peripheral portion of said base member thereby affording connecting means for joining said valve with a human heart.

3. A one-way valve device of the type defined in claim 1, said base member formed in a circular shape, a circular opening provided therein, said valve plate being of circular shape to cover said circular opening.

4. A one-way valve comprising a base member having an opening therein, and two swingable valve plates, the shape of each of said valve plates being complementary to form a shape slightly larger than said opening of said base member when assembled together so as to completely cover said opening in close contact therewith, said base member being provided with two pairs of cutouts at the periphery of said opening, each of said pairs of cutouts being in engagement with a corresponding pair of cutouts provided in the periphery of each of said two swingable valve plates, said valve plates placed in neighbouring relationship to each other for swinging, thereby opening and covering the opening of said base member in close contact therewith when said valve plates are in closed position, the location of the cutouts of each of said valve plates being such that the area of the portion of each of said valve plates divided by the line passing through the cutouts provided in the valve plate is greater than the remaining area of the valve plate, stepped arrangement being provided at least in the regions of the cutouts in at least one of said base member and said valve plates so as to permit the valve plates to completely cover the peripheral surface of the opening of said base member when said valve plates are in closed positions.

5. An artificial valve device of the type defined in claim 4, a strong soft fabric mounted around the peripheral portion of said base member thereby affording connecting means for joining said valve with a human heart.

6. A one-way valve device of the type defined in claim 4, the cutouts in the periphery of the opening of the base member provided at positions adjacent to a center line of the opening so that the major portions of the valve plates remote from said center line can be opened and closed for major valving action.

7. A one-way valve device of the type defined in claim 4, the cutouts in the periphery of the opening of the base member provided at positions remote from a center line of the opening so that the major portions of the valve plates adjacent to said center line can be opened and closed for major valving action.

8. A one-way valve device of the type defined in claim 4, additional valve plates, the shape of each of which is complementary to form a shape slightly larger than the opening of the base member when assembled, said valve plates being opened and closed simultaneously by virtue of the engagement of the cutouts in the valve plates with the corresponding cutouts in the periphery of the opening when they are mounted on the base member.

References Cited

UNITED STATES PATENTS

| | | | |
|---|---|---|---|
| 623,478 | 4/1899 | Keene | 137—527.8 XR |
| 2,292,003 | 8/1942 | Yant et al. | 137—512.15 |
| 3,197,788 | 8/1965 | Segger | 3—1 |
| 3,370,305 | 2/1968 | Goot et al. | 3—1 |

OTHER REFERENCES

"Artificial Mitral Valves" by J. H. Stuckey, IRE Transactions on Medical Electronics, March 1959, vol. ME6, No. 1, p. 42.

"A Hinged-Leaflet Valve for Total Replacement of the Human Aortic Valve" by Vincent L. Gott et al., Journal of Thoracic and Cardiovascular Surgery, November 1964, vol. 48, No. 5, pp. 713–725.

RICHARD A. GAUDET, *Primary Examiner.*

R. L. FRINKS, *Assistant Examiner.*

U.S. Cl. X.R.

137—512, 512.1, 527.8